United States Patent
Francois et al.

(10) Patent No.: US 7,842,371 B2
(45) Date of Patent: Nov. 30, 2010

(54) WASHCOAT LOADED POROUS CERAMICS WITH LOW BACKPRESSURE

(75) Inventors: Eric Jean Paul Francois, Thomery (FR); Guillaume Guzman, Veneux-les Sablons (FR); Maxime Moreno, St. Ange le Vieil (FR); Christophe Michel Remy, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/313,367

(22) Filed: Nov. 19, 2008

(65) Prior Publication Data

US 2009/0130381 A1 May 21, 2009

Related U.S. Application Data

(60) Provisional application No. 61/003,749, filed on Nov. 20, 2007.

(51) Int. Cl.
*B32B 3/12* (2006.01)
*B01J 21/00* (2006.01)
*B01J 21/02* (2006.01)

(52) U.S. Cl. .................. 428/116; 502/527.15; 502/100; 502/236

(58) Field of Classification Search ........................ None
See application file for complete search history.

(56) References Cited

U.S. PATENT DOCUMENTS

| 2001/0044376 A1* | 11/2001 | Noda et al. | 502/206 |
| 2007/0077190 A1 | 4/2007 | Ohno | 423/345 |
| 2007/0224092 A1* | 9/2007 | Miyairi et al. | 422/180 |

FOREIGN PATENT DOCUMENTS

| EP | 1 475 151 | 11/2004 |
| EP | 1 837 494 | 9/2007 |
| WO | 2008/094889 | 8/2008 |

OTHER PUBLICATIONS

Schaefer-Sindlinger, A., et al., "Efficient material design for diesel particulate filters," Topics in Catalysis vols. 42-43, May 2007, p. 307-317.

* cited by examiner

*Primary Examiner*—Gordon R Baldwin
(74) *Attorney, Agent, or Firm*—Matthew B. McNutt (57) ABSTRACT

Disclosed are washcoated ceramic honeycomb filters. The ceramic filters exhibit a relatively high level of washcoat loading while exhibiting minimized levels of backpressure. Also disclosed are methods for manufacturing the washcoated ceramic honeycomb filters. The method comprises providing an cell geometry derived from a predetermined level of washcoat loading to be applied to the ceramic honeycomb article.

17 Claims, 4 Drawing Sheets

WASHCOAT LOADED POROUS CERAMICS WITH LOW BACKPRESSURE

This application claims the benefit of and priority to U.S. Patent Application No. 61/003,749 filed on Nov. 20, 2007, the content of which is relied upon and incorporated herein by reference in its entirety.

FIELD

Parts of this invention were made with Government The present invention relates to the manufacture of porous ceramic honeycomb particulate filters, and more particularly to the manufacture of porous ceramic honeycomb particulate filters having catalyst loadings.

BACKGROUND

Recently, much interest has been directed towards the diesel engine due to its efficiency, durability and economical aspects. However, diesel emissions have been scrutinized both in the United States and Europe. As such, stricter environmental regulations will require diesel engines to be held to relatively stringent emission standards. In the near future, regulations will require NOx treatment in combination with particulate filtering. This will lead to the need to develop very complex exhaust systems including NOx catalyst integration into DPF (such as SCR or LNT catalyst) to decrease exhaust system treatment volume, i.e., decrease the number of after treatment components.

One of the biggest challenges in integrating this additional catalyst exhaust treatment is minimizing the resulting backpressure which can penalize and diminish engine performance. Generally, it has been accepted that smaller honeycomb wall thickness and higher frontal areas enable a lower pressure drop across a washcoated particulate filter. However, the significantly high level of washcoat loadings that can be required to meet strict regulations can result in significant increases in backpressure, thus resulting in diminished engine performance. Accordingly, there is a need in the art for honeycomb filters that can enable the application of high levels of washcoat loadings while minimizing the undesired increase in backpressure.

The present disclosure provides a greater understanding of the relationship between honeycomb cell geometry and washcoat thickness and provides methods for optimizing cell geometries that can enable high washcoat loadings while minimizing relative increases in backpressure.

SUMMARY

The present disclosure provides, in one embodiment, a method for manufacturing washcoat loaded ceramic honeycomb filters exhibiting high levels of washcoating together with minimized increases in backpressure. In particular, it has been discovered that an inventive relationship exists between the washcoat loading, and the cell geometry of the ceramic honeycomb article upon which the washcoat is to be applied. Contrary to the conventionally accepted practices, according to the present invention it has been surprisingly demonstrated that in the case of high catalyst loadings, the use of increased wall thicknesses leads to a lowering of the resulting back pressure. In addition the use of thicker walls has also the advantage of improving mechanical resistance of high porosity ceramic articles, survivability and filtration efficiency.

In one embodiment, the present disclosure provides a porous ceramic article, comprising a honeycomb ceramic structure defining a plurality of cell channels bounded by porous cell channel walls that extend longitudinally from an upstream inlet end to a downstream outlet end, wherein the plurality of cell channels are present in a cell channel density of "X" cells per square inch. A catalyst containing washcoat is applied to the porous cell channel walls in a washcoat loading amount "WC" of at least 40 g/l. The porous ceramic honeycomb structure exhibits an optimized cell geometry wherein the cell channel density "X" satisfies the relationship $X_1 \leq X \leq X_2$, wherein $X_1 = 5.95 \cdot 10^{-3} \times WC^2 + 2.44 \times WC - 36.8$, and wherein $X_2 = -1.46 \cdot 10^{-2} \times WC^2 + 3.89 \times WC + 255$. Further, the porous cell channel walls have a wall thickness of "Y" that also satisfies the relationship $Y_1 \leq Y \leq Y_2$; wherein $Y_1 = (A \cdot X^2) + (B \cdot X) + C$, wherein $Y_2 = (D \cdot X^2) + (E \cdot X) + F$; and wherein $A = 1.10 \cdot 10^{-12} \times WC^4 - 4.25 \cdot 10^{-10} \times WC^3 + 5.92 \cdot 10^{-8} \times WC^2 - 3.23 \cdot 10^{-6} \times WC + 1.38 \cdot 10^{-4}$; $B = -3.95 \cdot 10^{-10} \times WC^4 + 1.4 \cdot 10^{-7} \times WC^3 - 1.89 \cdot 10^{-5} \times WC^2 + 6.32 \cdot 10^{-4} \times WC - 5.60 \cdot 10^{-2}$; $C = 4.18 \cdot 10^{-6} \times WC^3 - 6.11 \cdot 10^{-4} \times WC^2 + 2.08 \cdot 10^{-1} \times WC + 3.74$; $D = -1.04 \cdot 10^{-12} \times WC^4 + 3.94 \cdot 10^{-10} \times WC^3 - 5.33 \cdot 10^{-8} \times WC^2 + 2.83 \cdot 10^{-6} \times WC - 1.31 \cdot 10^{-4}$; $E = 3.97 \cdot 10^{-10} \times WC^4 - 1.41 \cdot 10^{-7} \times WC^3 + 1.65 \cdot 10^{-5} \times WC^2 - 4.63 \cdot 10^{-4} \times WC + 1.68 \cdot 10^{-2}$; and $F = -4.65 \cdot 10^{-8} \times WC^4 + 1.65 \cdot 10^{-5} \times WC^3 - 1.75 \cdot 10^{-3} \times WC^2 + 8.98 \cdot 10^{-2} \times WC + 8.56$.

In still another embodiment, the present disclosure provides a method for manufacturing a porous ceramic wall flow filter summarized above. The method comprises first determining a desired amount of a washcoat loading to be applied to a porous ceramic honeycomb article. A honeycomb green body is then formed from a plasticized ceramic forming batch composition, the green body defining a plurality of cell channels bounded by cell channel walls that extend longitudinally from an upstream inlet end to a downstream outlet end. The formed green body is subsequently fired under conditions effective to convert the ceramic forming batch composition into a porous sintered phase ceramic composition and to provide a ceramic honeycomb structure defining a plurality of porous cell channels bounded by porous cell channel walls that extend longitudinally from an upstream inlet end to a downstream outlet end. After firing, the plurality of porous cell channels are present in a cell channel density of "X" cells per square inch wherein "X" satisfies the relationship $X_1 \leq X \leq X_2$; wherein $X_1 = 5.95 \cdot 10^{-3} \times WC^2 + 2.44 \times WC - 36.8$, and wherein $X_2 = -1.46 \cdot 10^{-2} \times WC^2 + 3.89 \times WC + 255$. Likewise, the porous cell channel walls have a wall thickness of "Y" that satisfies the relationship $Y_1 \leq Y \leq Y_2$; wherein $Y_1 = (A \cdot X^2) + (B \cdot X) + C$; wherein $Y_2 = (D \cdot X^2) + (E \cdot X) + F$; and wherein: $A = 1.10 \cdot 10^{-12} \times WC^4 - 4.25 \cdot 10^{-10} \times WC^3 + 5.92 \cdot 10^{-8} \times WC^2 - 3.23 \cdot 10^{-6} \times WC + 1.38 \cdot 10^{-4}$; $B = -3.95 \cdot 10^{-10} \times WC^4 + 1.4 \cdot 10^{-7} \times WC^3 - 1.89 \cdot 10^{-5} \times WC^2 + 6.32 \cdot 10^{-4} \times WC - 5.60 \cdot 10^{-2}$; $C = 4.18 \cdot 10^{-6} \times WC^3 - 6.11 \cdot 10^{-4} \times WC^2 + 2.08 \cdot 10^{-1} \times WC + 3.74$; $D = -1.04 \cdot 10^{-12} \times WC^4 + 3.94 \cdot 10^{-10} \times WC^3 - 5.33 \cdot 10^{-8} \times WC^2 + 2.83 \cdot 10^{-6} \times WC - 1.31 \cdot 10^{-4}$; $E = 3.97 \cdot 10^{-10} \times WC^4 - 1.41 \cdot 10^{-7} \times WC^3 + 1.65 \cdot 10^{-5} \times WC^2 - 4.63 \cdot 10^{-4} \times WC + 1.68 \cdot 10^{-2}$; and $F = -4.65 \cdot 10^{-8} \times WC^4 + 1.65 \cdot 10^{-5} \times WC^3 - 1.75 \cdot 10^{-3} \times WC^2 + 8.98 \cdot 10^{-2} \times WC + 8.56$. After firing, the predetermined amount of washcoat loading is then applied to the porous cell channel walls.

Additional embodiments in accordance with the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments according to the instant invention and together with the description, serve to explain, without limitation, the principles of the invention.

DETAILED DESCRIPTION

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular embodiments only and is not intended to be limiting.

The following description is provided as an enabling teaching of the invention in its currently known embodiments. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the disclosed embodiment without utilizing other features. Accordingly, those who work in the art will recognize that many modifications and adaptations to the disclosed embodiment are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both embodiments of the invention including and excluding the component.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As briefly summarized above, the present invention provides a novel method for manufacturing a washcoat loaded ceramic honeycomb article having optimized cell geometry. The optimized cell geometry enables the manufacture of washcoat loaded honeycomb articles that exhibit reduced levels of backpressure after that application of relatively high washcoat loadings. As one of ordinary skill in the art will appreciate, undesirable backpressure or pressure drop across a wall flow combustion exhaust filter can have adverse affects on engine performance. To that end, several factors can contribute to the existence of pressure drop along a washcoat loaded honeycomb wall flow filter. These exemplary factors can include a contraction of the airflow at the entrance of the filter; flow dynamics inside the inlet channel; flow through the porous walls; flow dynamics inside the outlet channel; and an expansion at the exit of the filter.

Through actual experimental data and computer modeling data set forth in the Examples below, applicants have provided a method for manufacturing a ceramic honeycomb wall flow filter having optimal honeycomb cell geometry. The optimal cell geometry can be derived that will minimize the occurrence of backpressure after the application of relatively high levels of wash coat loadings. In particular, an inventive relationship exists between the desired level of washcoat loadings, the cell density of the honeycomb filter and the wall thickness of the cell channel walls that define the cells of the honeycomb filter. It has been found that this relationship can be optimized to enable the manufacture of wall flow filters having higher levels of washcoat loadings applied to the filter with a minimal resulting increase in undesired backpressure.

Initially, the optimal cell geometry will depend in part upon a desired level of washcoat loading to be applied. Thus, in order to determine the optimized cell geometry, the desired amount of washcoat loading to be applied to the porous ceramic honeycomb article is first determined. To that end, the method of the present invention is applicable to the manufacture of catalyst washcoated honeycomb filters having any desired amount of a catalyst wash coat applied to the porous cell channel walls of a porous ceramic honeycomb wall flow filter. For example, in one aspect, a desired washcoat loading can be at least 40 g/l, at least 80 g/l, at least 100 g/l, or even at least 120 g/l. In another aspect, the desired washcoat loading can be an amount in the range of from 40 g/l to 250 g/l.

Once the desired amount of washcoat loading "WC" has been determined for a given application, the optimal cell geometry for the predetermined washcoat loading can be determined according to the inventive relationship between washcoat loading, cell density and cell wall thickness. The determination of the optimized geometry enables the manufacture of the porous ceramic honeycomb article to which the washcoat will be applied. To that end, the optimized porous ceramic honeycomb article defines a plurality of cell channels present in a cell channel density of "X" cells per square inch and bounded by cell channel walls having a wall thickness of "Y" inches that extend longitudinally from an upstream inlet end to a downstream outlet end.

The optimal cell channel density "X" is derived from the predetermined washcoat loading WC and satisfies the relationship $X_1 \leq X \leq X_2$. The values of $X_1$ and $X_2$ are determined according to equations 1 and 2 below:

$$X_1 = 5.95 \cdot 10^{-3} \times WC^2 + 2.44 \times WC - 36.8 \quad \text{(Eq. 1)}$$

$$X^2 = -1.46 \cdot 10^{-2} \times WC^2 + 3.89 \times WC + 255 \quad \text{(Eq. 2)}$$

The optimal wall thickness Y for the ceramic honeycomb article is then derived from the predetermined washcoat loading WC and the optimized cell density "X" described above. In particular, the porous cell channel walls have a wall thickness of "Y" inches that satisfies the relationship $Y_1 \leq Y \leq Y_2$. The values of $Y_1$ and $Y_2$ are determined according to equations 3 and 4 below:

$$Y_1 = (A \cdot X^2) + (B \cdot X) + C \quad \text{(Eq. 3)}$$

$$Y_2 = (D \cdot X^2) + (E \cdot X) + F \quad \text{(Eq. 4)}$$

The values of terms A, B, C, D, E, and F from equations 3 and 4 above are further derived from the predetermined washcoat loading WC and according to equations 5 through 10 below:

$$A = 1.10 \cdot 10^{-12} \times WC^4 - 4.25 \cdot 10^{-10} \times WC^3 + 5.92 \cdot 10^{-8} \times WC^2 - 3.23 \cdot 10^{-6} \times WC + 1.38 \cdot 10^{-4} \quad \text{(Eq. 5)}$$

$$B = -3.95 \cdot 10^{-10} \times WC^4 + 1.4 \cdot 10^{-7} \times WC^3 - 1.89 \cdot 10^{-5} \times WC^2 + 6.32 \cdot 10^{-4} \times WC - 5.60 \cdot 10^{-2} \quad \text{(Eq. 6)}$$

$$C = 4.18 \cdot 10^{-6} \times WC^3 - 6.11 \cdot 10^{-4} \times WC^2 + 2.08 \cdot 10^{-1} \times WC + 3.74; \quad \text{(Eq. 7)}$$

$$D = -1.04 \cdot 10^{-12} \times WC^4 + 3.94 \cdot 10^{-10} \times WC^3 - 5.33 \cdot 10^{-8} \times WC^2 + 2.83 \cdot 10^{-6} \times WC - 1.31 \cdot 10^{-4} \quad \text{(Eq. 8)}$$

$$E = 3.97 \cdot 10^{-10} \times WC^4 - 1.41 \cdot 10^{-7} \times WC^3 + 1.65 \cdot 10^{-5} \times WC^2 - 4.63 \cdot 10^{-4} \times WC + 1.68 \cdot 10^{-2}; \quad \text{(Eq. 9)}$$

$$F = -4.65 \cdot 10^{-8} \times WC^4 + 1.65 \cdot 10^{-5} \times WC^3 - 1.75 \cdot 10^{-3} \times WC^2 + 8.98 \cdot 10^{-2} \times WC + 8.56; \quad \text{(Eq. 10)}$$

According to the above calculations, optimized cell channel densities "X" can include densities of at least 50 cells per square inch, at least 70 cells per square inch, at least 100 cells per square inch, at least 200 cells per square inch, at least 300 cells per square inch, or even a cell density of at least 500 cells per square inch. In embodiments, the porous ceramic honeycomb body can have a cell channel density "X" in the range of from 50 to 400 cells per square inch.

According to the above calculations, optimized wall thicknesses can also include cell wall thicknesses that are in the range of from 10 mil inches (0.010 inches) to 30 mil inches (0.030 inches). In other embodiments, the cell wall thickness can be in the range of from 12 mil inches (0.012 inches) to 20 mil inches. In still other embodiments, the cell wall thickness can be in the range of from 14 mil inches (0.014 inches) to 18 mil inches (0.018 inches).

In addition to the optimized cell geometry, the porous ceramic honeycomb article preferably exhibits a total porosity % P in the range of from 40% to 80%. For example, in embodiments the porosity % P can be at least 60%. In a more preferred embodiment, the porous ceramic honeycomb article preferably exhibits a total porosity % P in the range of from 60% to 70%. In still a more preferred embodiment, the porous ceramic honeycomb article preferably exhibits a total porosity % P in the range of from 60% to 80%.

Once the optimized cell geometry for the ceramic honeycomb structure has been determined, the honeycomb structure exhibiting the optimized cell geometry can then be formed from any conventional material suitable for forming a porous monolithic honeycomb body. For example, in one embodiment, the structure can be formed from a plasticized ceramic forming composition. Exemplary ceramic forming compositions can include those conventionally known for forming cordierite, aluminum titanate, silicon carbide, aluminum oxide, zirconium oxide, zirconia, magnesium stabilized zirconia, zirconia stabilized alumina, yttrium stabilized zirconia, calcium stabilized zirconia, magnesium stabilized alumina, calcium stabilized alumina, titania, silica, magnesia, niobia, ceria, vanadia, nitride, carbide, metal, zeolites or any combination thereof.

The honeycomb structure can be formed according to any conventional process suitable for forming honeycomb monolith bodies. For example, in one embodiment a plasticized ceramic forming batch composition can be shaped into a green body by any known conventional ceramic forming process, such as, e.g., extrusion, injection molding, slip casting, centrifugal casting, pressure casting, dry pressing, and the like. Preferably, the ceramic precursor batch composition comprises inorganic ceramic forming batch component(s) capable of forming, for example, one or more of the sintered phase ceramic compositions set forth above, a liquid vehicle, a binder, and one or more optional processing aids and additives including, for example, lubricants, and/or a pore former. In an exemplary embodiment, extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The inorganic batch components can be selected so as to yield a ceramic honeycomb article comprising cordierite, mullite, spinel, aluminum titanate, or a mixture thereof upon firing. For example, and without limitation, in one embodiment, the inorganic batch components can be selected to provide a cordierite composition consisting essentially of, as characterized in an oxide weight percent basis, from about 49 to about 53 percent by weight $SiO_2$, from about 33 to about 38 percent by weight $Al_2O_3$, and from about 12 to about 16 percent by weight MgO. To this end, an exemplary inorganic cordierite precursor powder batch composition preferably comprises about 33 to about 41 weight percent aluminum oxide source, about 46 to about 53 weight percent of a silica source, and about 11 to about 17 weight percent of a magnesium oxide source. Exemplary non-limiting inorganic batch component mixtures suitable for forming cordierite include those disclosed in U.S. Pat. Nos. 3,885,977; RE 38,888; 6,368,992; 6,319,870; 6,214,437; 6,210,626; 5,183,608; 5,258,150; 6,432,856; 6,773,657; 6,864,198; and U.S. Patent Application Publication Nos.: 2004/0029707; 2004/0261384.

Alternatively, in another embodiment, the honeycomb body can be formed from inorganic batch components selected to provide, upon firing, a mullite composition consisting essentially of, as characterized in an oxide weight percent basis, from 27 to 30 percent by weight $SiO_2$, and from about 68 to 72 percent by weight $Al_2O_3$. An exemplary inorganic mullite precursor powder batch composition can comprise approximately 76% mullite refractory aggregate; approximately 9.0% fine clay; and approximately 15% alpha alumina. Additional exemplary non-limiting inorganic batch component mixtures suitable for forming mullite include those disclosed in U.S. Pat. Nos. 6,254,822 and 6,238,618.

Still further, the honeycomb body can be formed from inorganic batch components selected to provide, upon firing, an aluminum-titanate composition consisting essentially of, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor powder batch composition can comprises approximately 10% quartz; approximately 47% alumina; approximately 30% titania; and approximately 13% additional inorganic additives. Additional exemplary non-limiting inorganic batch component mixtures suitable for forming aluminum titanate include those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos.: WO 2006/015240; WO 2005/046840; and WO 2004/011386.

The formed green body can then be dried to remove at least substantially all of any liquid vehicle present that may be present within the ceramic forming batch composition. As used herein, at least substantially all includes the removal of at least 95%, at least 98%, at least 99%, or even at least 99.9% of the liquid vehicle present. Exemplary and non-limiting drying conditions suitable for removing the liquid vehicle include heating the honeycomb green body at a temperature of at least 50° C., at least 60° C., at least 70° C., at least 80° C., at least 90° C., at least 100° C., at least 110° C., at least 120° C., at least 130° C., at least 140° C., or even at least 150° C. for a period of time sufficient to at least substantially remove the liquid vehicle. In one embodiment, the conditions effective to at least substantially remove the liquid vehicle comprise heating at a temperature of at least about 60° C. Further, the heating can be provided by any conventionally known method, including for example, hot air drying, RF, or microwave drying.

After drying, the green body can then be fired under conditions effective to convert the ceramic forming batch composition into a sintered phase ceramic composition. As one of ordinary skill in the art will appreciate, the conditions effective to convert the ceramic forming batch composition into a sintered phase ceramic composition will depend, at least in part, upon the particular batch composition used to formed the honeycomb green body and will be readily obtainable to the skilled artisan without requiring any undue experimentation. However, in an exemplary embodiment, the conditions effective for converting the ceramic forming batch composition into a sintered phase ceramic composition can include firing the formed green body at a maximum firing temperature in the range of from 1350° C. to 1500° C. Maximum firing temperature in the range of from 1375° C. to 1425° C. is desirable for the formation of cordierite.

Selected channels of the honeycomb bodies described above can further be plugged with any conventionally known plugging composition. For example, selected channels can be plugged to provide a "wall flow" configuration wherein at least a portion of the plurality of cell channels comprise an end plug sealed to the respective channel walls. In a preferred embodiment, a first portion of the plurality of cell channels comprise a plug sealed to the respective channel walls at or near the downstream outlet end to form inlet cell channels and a second portion of the plurality of cell channels comprise a plug sealed to the respective channel walls at or near the upstream inlet end to form outlet cell channels. According to this example, the flow paths resulting from alternate channel plugging direct a fluid or gas stream entering the upstream inlet end of the exemplified honeycomb structure, through the porous ceramic cell walls prior to exiting the filter at the downstream outlet end. The plugging can be effectuated by, for example, using a conventional masking apparatus and process such as that disclosed and described in U.S. Pat. No. 6,673,300, the entire disclosure of which is incorporated by reference herein. After plugging, the plugging composition can also be dried and fired under conditions similar to those described above for drying and firing the honeycomb green body.

In one embodiment, the step of firing the plugging material can be a "single fire" process. According to this embodiment, the selectively end plugged honeycomb structure is a green body or unfired honeycomb body comprised of a dried plasticized ceramic forming precursor composition. The conditions effective to fire the plugging mixture are also effective to convert the dried ceramic precursor composition of the green body into a sintered phase ceramic composition. Further according to this embodiment, the unfired honeycomb green body can be selectively plugged with a plugging mixture having a composition that is substantially equivalent to the inorganic composition of the honeycomb green body. Thus, the plugging material can for example comprise either the same raw material sources or alternative raw material sources chosen to at least substantially match the drying and firing shrinkage of the green honeycomb. Exemplary conditions effective to simultaneously single fire the plugging mixture and the green body can comprise firing the selectively plugged honeycomb body at a maximum firing temperature in the range of from 1350° C. to 1500° C., and more preferably at a maximum firing temperature in the range of from 1375° C. to 1425° C.

In an alternative embodiment, the step of firing the plugging material can be a "second fire" process. According to this embodiment, the provided honeycomb structure has already been fired to provide a ceramic honeycomb body prior to selectively end plugging the honeycomb structure with the plugging mixture of the present invention. Accordingly, the conditions effective to fire the plugging mixture are those effective to convert the plugging mixture into the ceramic composition. To this end, it can be desirable to selectively plug one or more channels of the honeycomb body with a plugging mixture that will result in a plug with physical properties similar to the honeycomb, but which can be fired without altering the properties of the ceramed honeycomb structure. For example, a plugging mixture according to this embodiment can be chosen to lower the peak firing temperature required for firing of the plugs to a temperature below the peak firing temperature of the fired ceramic honeycomb body. The conditions effective to fire the plugging mixture in a second fire process will again depend in part on the particular composition of the plugging material. However, effective firing conditions can comprise firing the plugging material at a maximum firing temperature of at least 700° C., at least 800° C., at least 900° C., or even at least 1000° C.

Once the honeycomb body has been fired to provide the porous ceramic article, a washcoat catalyst can then be applied to the porous ceramic walls of the honeycomb body in the desired predetermined amount. Any conventionally known catalyst containing washcoat composition can be applied. However, in exemplary non-limiting embodiments, preferred catalyst containing washcoat compositions include titania-alumina, alumina-ceria-zirconia, or alumina-platinum containing washcoat compositions. To apply the catalyst to the honeycomb, the porous honeycomb can be introduced into a slurry containing a catalyst washcoat for impregnation. The slurry concentration may for example be in the range of from 5% to 30% catalyst. Water is typically used as the liquid medium for the slurry however other liquids or mixtures thereof may be used. After impregnation of the washcoat composition into the porous ceramic structure, the honeycomb can be removed from the slurry and agitated in order to remove excess slurry. The impregnated honeycomb can then be dried at room temperature or higher, under for example an air flux. Still further, the honeycomb and washcoat can be treated at a consolidation temperature typically higher than 500° C. This process can be repeated until the desired predetermined washcoat loading has been achieved.

In another embodiment, the present invention provides the washcoated ceramic honeycomb articles manufacture by the methods described herein.

EXAMPLES

To further illustrate the principles of the present invention, the following examples are put forth so as to provide those of ordinary skill in the art with a complete disclosure and description of how the methods and articles claimed herein can be practiced and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is ° C. or is at ambient temperature, and pressure is at or near atmospheric.

Example 1

Effect of Wall Thickness on Backpressure

In a first set of examples, two series of cordierite filters were evaluated to determine the effect of wall thickness on backpressure for a relatively heavily washcoated honeycomb filter. A first series of two filters (filter A and filter B) were evaluated, each comprising a cell density of 200 cell/inch$^2$ and wall porosity of 60%. To evaluate the effect of varying wall thickness on backpressure, filter A had an average cell wall thickness of 369 μm (14.5 mill inches). Filter B had an average cell wall thickness of 326 μm (12.8 mill inches). The filters were then washcoat loaded progressively up to a wash coat loading of about 100 g/l and the resulting pressure loss was measured at each loading amount under a gas flow rate of 210 cubic feet per minute (cfm) allowing a comparison of the evolution of the pressure loss related to the increased washcoat loading and also to compare filters with different wall thickness.

Figure 1:
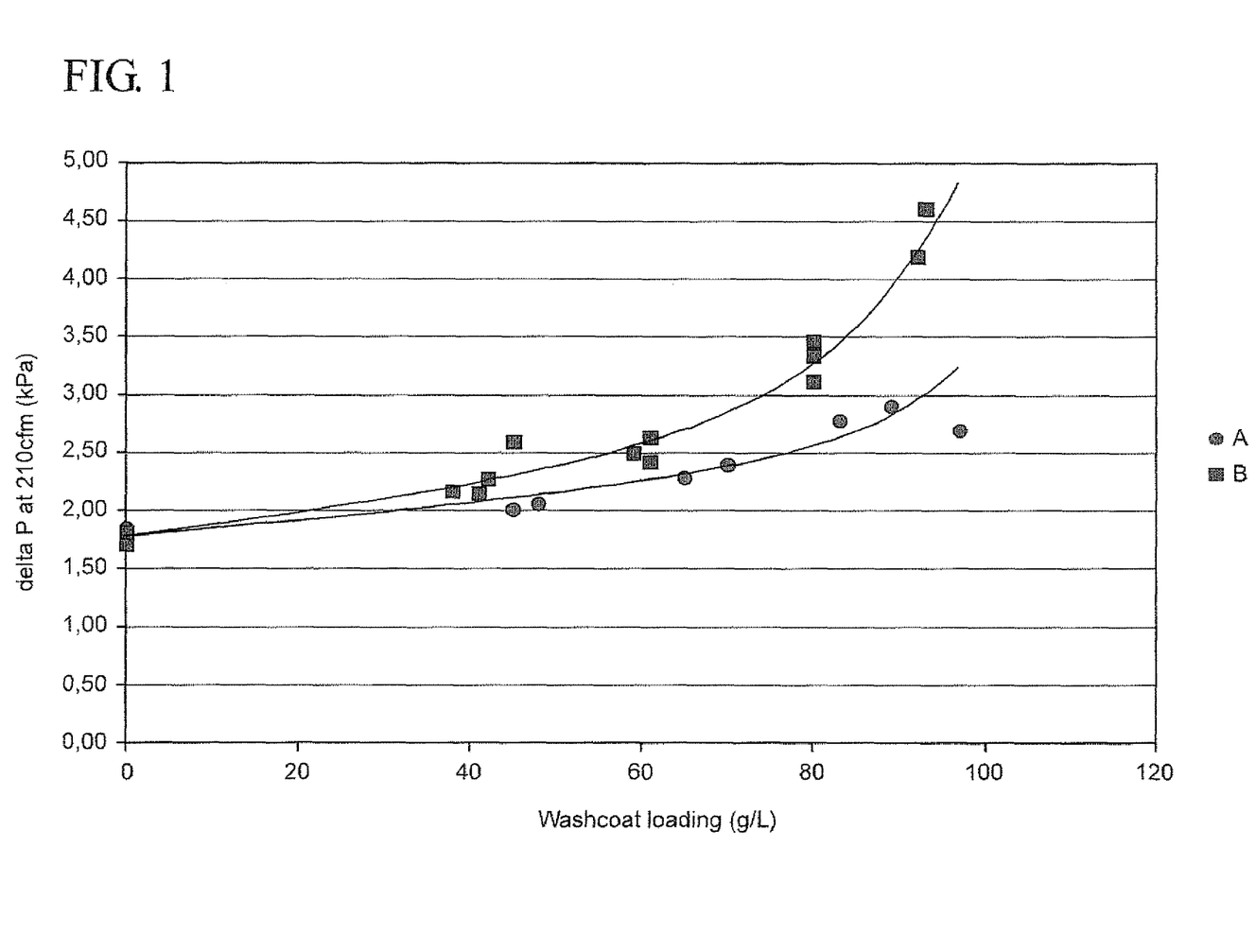
FIG. 1 is a plot of pressure loss as function of washcoat loading for the first series of ceramic filters (A and B) evaluated in Example 1.

The data from the evaluation of the first series of filters (A and B) is set forth in FIG. 1. The data show that the for two filters having the same total porosity and the same cell density of 200 cells/inch$^2$ but having different cell wall thickness exhibited similar pressure loss at the bare state (without washcoat). However, the relative increase of pressure loss with increase washcoat loading was smaller for the filter having a greater wall thickness.

The second series of two filters (filter C and filter D) were evaluated, each comprising a cell density of 200 cell/inch$^2$ and wall porosity of 70%. Again, to evaluate the effect of varying wall thickness on backpressure, filter C had an average cell wall thickness of wall thickness of 272 μm (10.7 mill inches). Filter D had an average cell wall thickness of 323 μm (12.7 mill inches). The filters were washcoat loaded progressively up to a wash coat loading of about 130 g/l and the resulting pressure loss was measured at each loading amount under a gas flow rate of 210 cubic feet per minute (cfm) allowing a comparison of the evolution of the pressure loss related to the increased washcoat loading and also to compare filters with different wall thickness.

Figure 2:
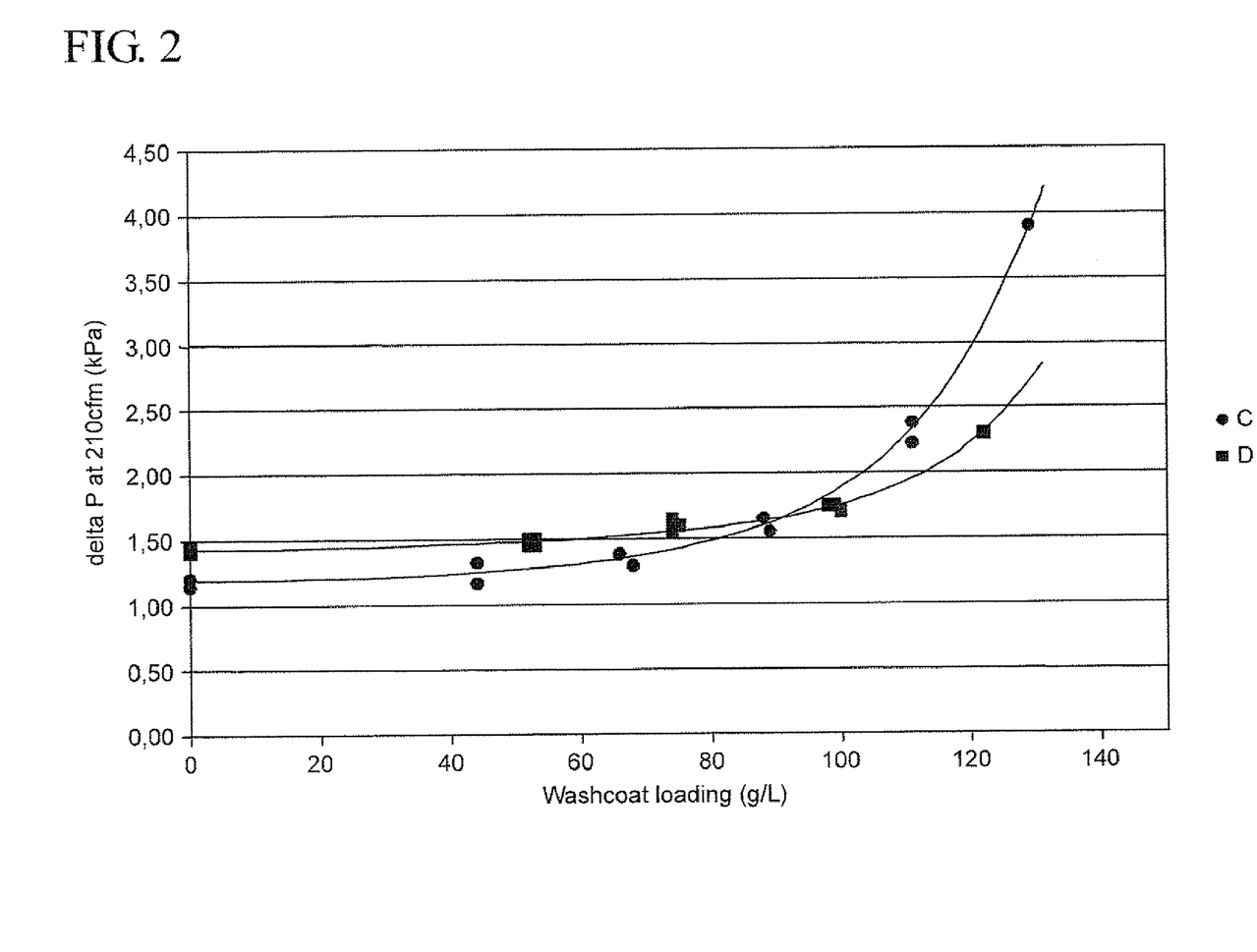
FIG. 2 is a plot of pressure loss as function of washcoat loading for the second series of ceramic filters (C and D) evaluated in Example 1.

The data from the evaluation of the second series of filters (C and D) is set forth in FIG. 2. The data show that filters C, having the thinner wall thickness, exhibited a lower pressure loss in the bare state (before washcoat loading). However, as the washcoat loading increased, the evolution of the pressure loss was different. In particular, the filter with thicker walls (filter D) exhibited a lower impact on pressure loss as the washcoat loading was increased.

The above experimental results indicate that by utilizing a cell geometry having relatively thicker cell channel walls, higher washcoat loadings are surprisingly possible with smaller impact on the pressure loss. Without intending to be limiting or bound by a particular theory, it is believed that this can be explained by the fact that with thicker walls, more washcoat volume can be loaded before leading to pore clogging and a corresponding increase in back pressure.

Example 2

Relationship Between Cell Geometry and Washcoat Loading

In a second set of examples, the relationship between washcoat loading and cell geometry was further evaluated using cordierite filters of varying cell densities and wall thicknesses. In particular, five cordierite filters (C, D, E, F, and G) were evaluated for resulting pressure drop at a gas flow rate of 45 Nm³/h at varying washcoat loadings ranging from the bare state (before washcoat) up to a washcoat loading of about 160 g/L. Filter C had a cell density of 200 CPSI and a cell wall thickness of 10.7 mils. Filter D had a cell density of 200 CPSI and a wall thickness of 12.7 mils. Filter E had a cell density of 262 CPSI and a wall thickness of 11.4 mils. Filter F had a cell density of 268 and a wall thickness of 12.7 mils. Filter G had a cell density of 287 CPSI and a wall thickness of 13.4 mils. The data resulting from the comparison is set forth in FIG. 3.

Figure 3:
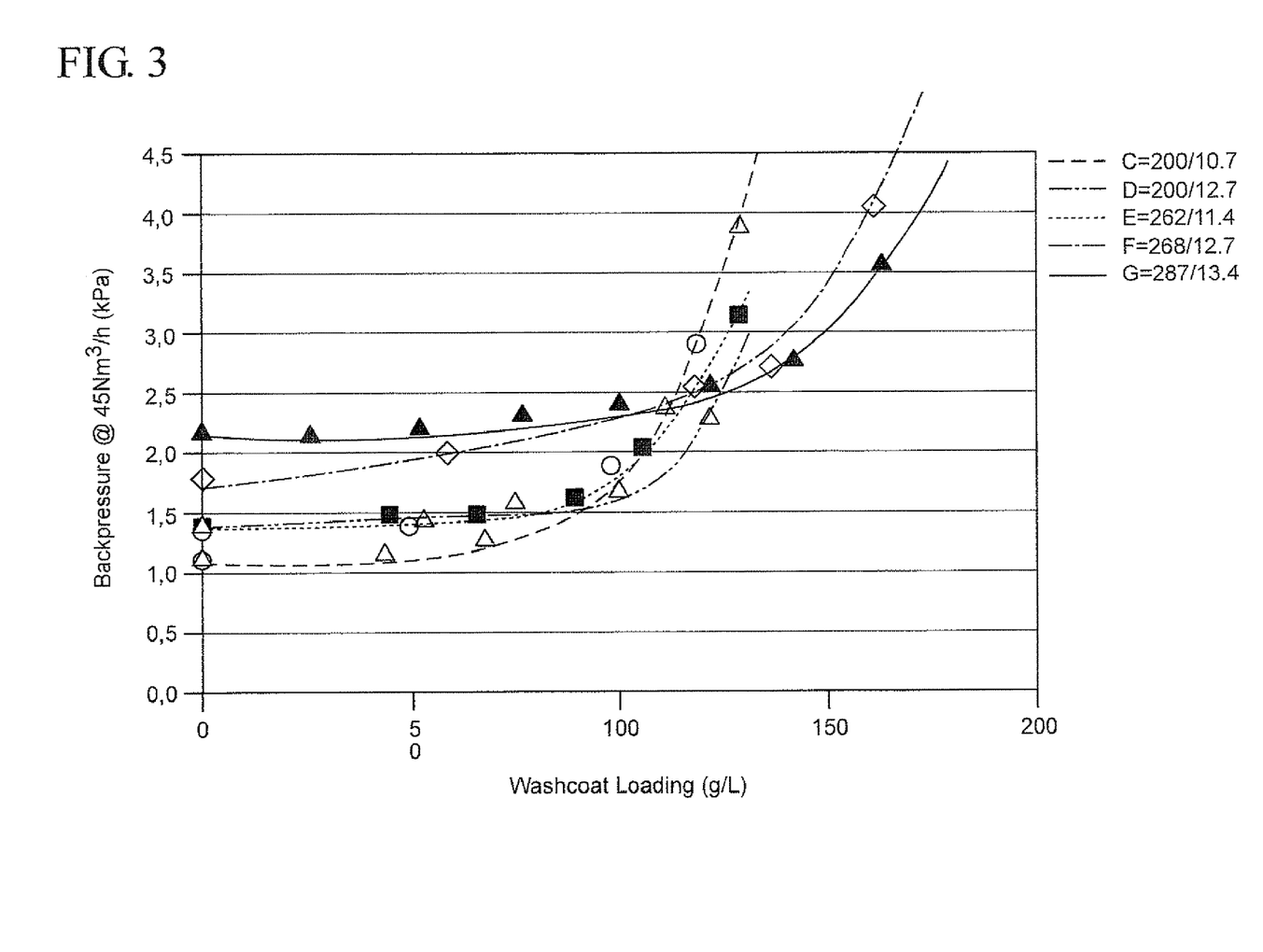
FIG. 3 is a plot of pressure loss as function of washcoat loading for ceramic filters C, D, E, F, and G, evaluated in Example 2.

The data in FIG. 3 confirms what was reported in connection with Example 1 above; that the increased wall thickness enabled a lower coated backpressure despite initial higher values at the bare state. Additionally, it can be seen that increasing the cell density also improved the coated backpressure. Without intending to be limiting or to be bound by any particular theory, it is believed that these results can be explained by considering the factors that contribute to the occurrence of backpressure.

First, with respect to the increased backpressure observed in the bare state before the application of a washcoat, by increasing the web thickness (Filter C vs. D and Filter E vs. F), the cell opening generally called hydraulic diameter is also decreased. This decrease in hydraulic diameter results in an increase in the entrance gas velocity (proportional to the square of hydraulic diameter). This increase in entrance velocity will also increase contraction losses at the entrance of the filter coupled with friction in inlet and outlet channel losses and expansion losses at the exit out the filter. This same phenomenon occurs when increasing cell density without the increase in web thickness. This explains the increase in backpressure at bare state (0 g/l of coating) moving from filters C to D and E to F.

For an evaluation of the washcoated backpressure data, only the material porosity of the cell channel walls was coated. This way, the cell channel size and aspect were not modified. Accordingly, the contraction, expansion and friction losses as explained above were not modified by the coating deposition. Although the washcoated backpressure for the samples evaluated increased relative to the initial bare state backpressure, the increase was as a function of the coating loading as the material porosity was filled, thus modifying its properties, such as permeability and wall entrance/exit effects. The greater web thickness and higher cell density allowed more washcoating to be loaded by proposing more open porosity so limiting the impact of coating on permeability. In other words, there was more space to store catalyst resulting in a smaller impact on permeability at similar coating level. This explains why at relatively high washcoat loadings, filter D exhibited a lower coated backpressure than C and likewise for a comparison of filters E and F.

Figure 4:
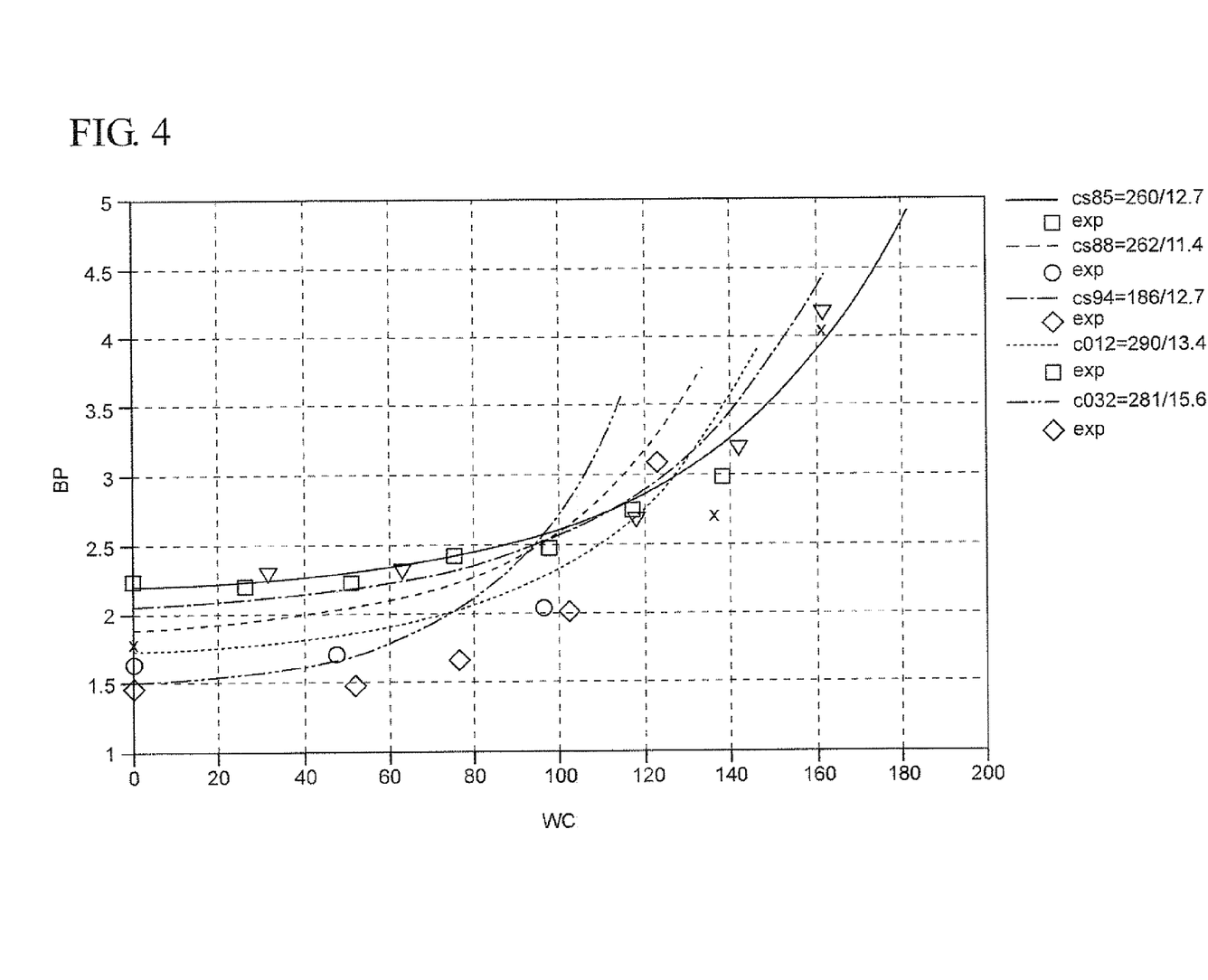
FIG. 4 is a plot of computer modeled pressure loss as a function of washcoat loading for five washcoated filters according to the present invention.

Following the actual experiments described above, computer model validation of the data for five modeled cordierite filters were also evaluated. In particular, the five modeled filters had cell density (CPSI)/wall thickness (mill inches) of 186/12.7, 260/12.7, 262/11.4, 290/13.4, and 281/15.6 respectively. The modeled filters were then computer model evaluated for resulting pressure drop at varying washcoat loadings ranging from the bare state (before washcoat) up to a washcoat loading of about 180 g/L. The data from this computer model experiment is set forth in FIG. 4. When the model data is compared to the previous experimental data and results discussed above, it can be seen that the results of the computer modeling are in substantial agreement with the actual experimental data, thus indicating that computer modeling is a viable option for evaluation of the relationship between washcoat loading and cell geometry in minimizing backpressure under high washcoat loadings.

Lastly, it should also be understood that while the present invention has been described in detail with respect to certain illustrative and specific embodiments thereof, it should not be considered limited to such, as numerous modifications are possible without departing from the broad scope of the present invention as defined in the appended claims.

The invention claimed is:

1. A porous ceramic article, comprising:
a honeycomb ceramic structure defining a plurality of cell channels bounded by porous cell channel walls having a porosity % P that extend longitudinally from an upstream inlet end to a downstream outlet end, wherein the plurality of cell channels are present in a cell channel density of "X" cells per square inch; and
a catalyst containing washcoat applied to the porous cell channel walls in a washcoat loading amount "WC" of at least 40 g/l such that the washcoat loading amount "WC" satisfies the relationships of:

$$X_1 = 5.95 \cdot 10^{-3} \times WC^2 + 2.44 \times WC - 36.8, \text{ and}$$

$$X_2 = -1.46 \cdot 10^{-2} \times WC^2 + 3.89 \times WC + 255,$$

wherein $X_1 \leq X \leq X_2$;
wherein the porous cell channel walls have a wall thickness of "Y" that satisfies the relationship $Y_1 \leq Y \leq Y_2$;

wherein $Y_1 = (A \cdot X^2) + (B \cdot X) + C$, wherein $Y_2 = (D \cdot X^2) + (E \cdot X) + F$;

wherein:

$$A = 1.10 \cdot 10^{-12} \times WC^4 - 4.25 \cdot 10^{-10} \times WC^3 + 5.92 \cdot 10^{-8} \times WC^2 - 3.23 \cdot 10^{-6} \times WC + 1.38 \cdot 10^{-4};$$

$$B = -3.95 \cdot 10^{-10} \times WC^4 + 1.4 \cdot 10^{-7} \times WC^3 - 1.89 \cdot 10^{-5} \times WC^2 + 6.32 \cdot 10^{-4} \times WC - 5.60 \cdot 10^{-2};$$

$$C = 4.18 \cdot 10^{-6} \times WC^3 - 6.11 \cdot 10^{-4} \times WC^2 + 2.08 \cdot 10^{-1} \times WC + 3.74;$$

$$D = -1.04 \cdot 10^{-12} \times WC^4 + 3.94 \cdot 10^{-10} \times WC^3 - 5.33 \cdot 10^{-8} \times WC^2 + 2.83 \cdot 10^{-6} \times WC - 1.31 \cdot 10^{-4};$$

$$E = 3.97 \cdot 10^{-10} \times WC^4 - 1.41 \cdot 10^{-7} \times WC^3 + 1.65 \cdot 10^{-5} \times WC^2 - 4.63 \cdot 10^{-4} \times WC + 1.68 \cdot 10^{-2}; \text{ and}$$

$$F = -4.65 \cdot 10^{-8} \times WC^4 + 1.65 \cdot 10^{-5} \times WC^3 - 1.75 \cdot 10^{-3} \times WC^2 + 8.98 \cdot 10^{-2} \times WC + 8.56; \text{ and}$$

wherein % P is in the range of from 40% to 80%.

2. The porous ceramic article of claim 1, wherein at least a portion of the plurality of cell channels comprise a ceramic plug sealed to the respective channel walls.

3. The porous ceramic article of claim 1, wherein a first portion of the plurality of cell channels comprise plugs sealed to the respective channel walls at or near a first end and a second portion of the plurality of cell channels comprise plugs sealed to the respective channel walls at or near a second end.

4. The porous ceramic article of claim 1, wherein the washcoat loading amount "WC" is at least 100 g/l.

5. The porous ceramic article of claim 1, wherein the washcoat loading amount "WC" is at least 80 g/l.

6. The porous ceramic article of claim 1, wherein the cell density X is in the range of from 70 cells per square inch to 400 cells per square inch.

7. The porous ceramic article of claim 1, wherein the honeycomb ceramic structure has a total porosity % P in the range of 60% to 80%.

8. The porous ceramic article of claim 1, wherein the ceramic article exhibits a lower backpressure than a comparable ceramic article comprising a ceramic structure defining a plurality of cell channels bounded by porous cell channel walls that extend longitudinally from an upstream inlet end to a downstream outlet end and comprising the desired washcoat loading amount "WC", wherein the plurality of cell channels of the comparable ceramic article are not present in a cell channel density of "X" cells per square inch that satisfies the relationship $X_1 \leq X \leq X_2$; where $X_1 = 5.95 \cdot 10^{-3} \times WC^2 + 2.44 \times WC - 36.8$, and where $X_2 = -1.46 \cdot 10^{-2} \times WC^2 + 3.89 \times WC + 255$; and wherein the porous cell channel walls of the comparable ceramic article do not have a wall thickness of "Y" that satisfies the relationship $Y_1 \leq Y \leq Y_2$;

where $Y_1 = (A \cdot X^2) + (B \cdot X) + C$, and where $Y_2 = (D \cdot X^2) + (E \cdot X) + F$.

9. The porous ceramic article of claim 1, wherein the honeycomb ceramic structure is comprised of a primary sintered phase ceramic cordierite composition.

10. The porous ceramic article of claim 1 wherein the catalyst in the washcoat is selected from the list consisting of titania-alumina and alumina-ceria-zirconia.

11. The porous ceramic article of claim 1 wherein the honeycomb ceramic structure has a total porosity % P of at least 60%.

12. The porous ceramic article of claim 1 wherein the honeycomb ceramic structure has a total porosity % P in the range of 60% to 80%.

13. The porous ceramic article of claim 1 wherein the cell density X is in the range of from 100 cells per square inch to 300 cells per square inch.

14. The porous ceramic article of claim 1 wherein a material of the honeycomb ceramic structure is selected from the list consisting of cordierite, mullite, spinel, aluminum titanate or combinations thereof.

15. The porous ceramic article of claim 1 wherein the honeycomb ceramic structure comprises from about 49% to about 53% by weight of $SiO_2$, from about 33% to about 38% by weight of $Al_2O_3$, and from about 12% to about 16% by weight of MgO.

16. The porous ceramic article of claim 1 wherein the honeycomb ceramic structure comprises from about 27% to about 30% by weight $SiO_2$ and from about 68% to about 72% by weight of $Al_2O_3$.

17. The porous ceramic article of claim 1 wherein the honeycomb ceramic structure comprises from about 8% to about 15% by weight $SiO_2$, from about 45% to about 53% by weight $Al_2O_3$, and from about 27% to about 33% by weight $TiO_2$.

* * * * *